UNITED STATES PATENT OFFICE.

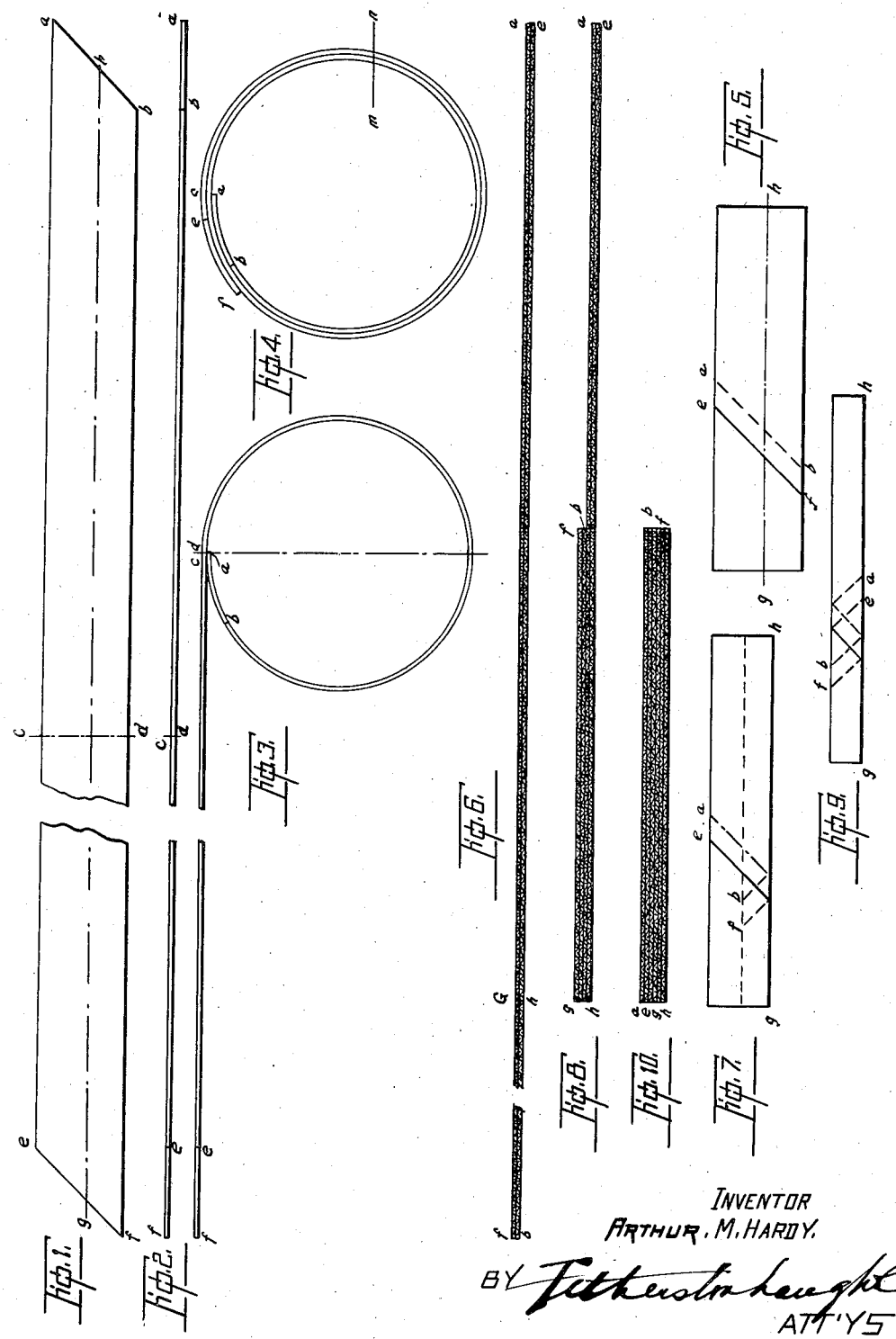

ARTHUR MARK HARDY, OF BOWMANVILLE, ONTARIO, CANADA.

ENDLESS BELT, STRAP, AND OTHER LIKE ARTICLE.

1,375,046.   Specification of Letters Patent.   Patented Apr. 19, 1921.

Application filed May 15, 1920. Serial No. 381,606.

*To all whom it may concern:*

Be it known that I, ARTHUR MARK HARDY, of the town of Bowmanville, in the county of Durham, in the province of Ontario, Dominion of Canada, have invented certain new and useful Improvements in Endless Belts, Straps, and other like Articles, of which the following is a specification.

This invention relates to improvements in endless belts, straps and like articles, and is adapted for use in straps, machine driving belts, automobile fan driving belts, and generally in endless belts utilized in the transmission of power. The objects of my invention are;

1. To make the endless belts, straps and other like articles strong, and durable and light in weight.

2. To incorporate in the endless belts, straps and other like articles such a degree of flexibility as will enable them to conform readily to a desired shape, and will permit of their free movement as desired without liability of encountering unnecessary resistance by chafing which would damage them and reduce their serviceability.

3. To give the endless belts, straps and other like articles, used in machine driving and power transmission, a smooth and regular surface, which will assure the maximum efficiency in mechanical operations.

4. To permit the endless belts, straps and other like articles to be bent or twisted in any direction and subjected to contrary flexion without any weakening, cracking or rupturing taking place; and generally to adapt the belts, straps, and other like articles, to better perform the functions required of them.

With the above, and other objects in view, the invention consists of a composite rubber fabric as hereinafter more particularly described in the specifications and accompanying drawings.

Figure 1 is a plan of the fabric used in my invention.

Fig. 2 is a side view of the fabric used in my invention.

Fig. 3 details the first and second operations in the construction of the articles to which this invention applies.

Fig. 4 is a side view after the completion of the second operation.

Fig. 5 is a plan of the end of the splice after operations Nos. 1 and 2 have been completed.

Fig. 6 is a sectional view after the completion of operation No. 2.

Fig. 7 is a plan of the end of the splice after operation No. 3 is completed.

Fig. 8 is a sectional view after the completion of operation No. 3.

Fig. 9 is a plan of the end of the splice after the completion of operation No. 4.

Fig. 10 is a sectional view illustrating in detail the completed operation No. 4.

Similar letters refer to similar parts throughout the several views and diagrams.

Referring to the drawings;

A strip of fabric which has been impregnated with rubber or a rubber compound is cut in the shape indicated by Fig. 1. The warp of this strip may run straight or on the bias. The length of this strip is slightly more than twice the circular length of the endless belt or strap to be manufactured, and it is approximately three times the width of the finished article. The ends of the strip are not at right angles to the sides, but are diagonal, and make angles of approximately 45 degrees and 135 degrees respectively with the sides.

Operation No. 1 consists in bringing the end $a\ b$ around so that the upper surface at $a$ is placed flat against the under surface of the strip at $c\ d$ (a transverse line across the strip distant from point $a$ once the circular length of the finished article.) Operation No. 2 consists in bringing the end $e\ f$ around so that the under surface of that part of the strip from $e\ f$ to $c\ d$ is placed flat against the original upper surface of the part from $a\ b$ to $c\ d$ and overlaps the join of the end $a\ b$ with $c\ d$.

Fig. 4 represents the fabric after the completion of the second operation.

Fig. 5 is a plan view of the end of the splice or join at that time. The fabric is now in the form of a two-ply endless belt of the full width of the original strip of fabric. Operation No. 3 consists in folding the edge $f\ d\ b$ inward along the line $g\ h$ which is approximately one-third the distance from the side $f\ d\ b$ to the side $e\ c\ a$ so that a cross-sectional view of the belt or other like article when this operation has been completed will appear as in Fig. 8.

Fig. 7 is a plan of the end of the splice or join at this stage of the process of manufacture. The belt is again folded in such a manner that the edge *e c a* and the line *g h*, which has become the second edge of the strip on the completion of operation No. 3, are brought together, and that part of the strip or belt from the edge *f d b* to the line *g h* is completely surrounded by the other portions of the strip.

Fig. 10 is a cross section of the belt at *m n* after the 4th operation, and Fig. 9 is a plan of the end of the splice.

By the application of heat and pressure to the belt, strap or other like article in this folded form, the process of manufacture is completed.

It should be noted that the following are the chief features of my invention.

1. Each belt, strap and like article is manufactured from a single strip of fabric which is approximately twice the circular length of the finished article, and three times its width.

2. There is, in each endless belt, strap and like article, an entire absence of any transverse join or splice, in the ordinarily accepted meanings of those terms, for the two ends of the strip of fabric used in making such belt or like article are separated by an intervening layer of fabric and never come in contact with one another. Therefore, the strain which ordinarily falls on a short join or splice is distributed throughout the entire circular length of the belts, etc., in which my invention is used.

3. There are no longitudinal seams.

4. The lateral folding makes each belt, strap and like article a complete unit, distinct from a series of layers.

5. In the strip of fabric used in any belt, strap or like article, the warp may run either straight or on the bias.

The elimination of the several transverse and longitudinal seams, joins or splices necessary or employed when endless belts, straps and other like articles are manufactured out of numbers of strips of fabric, imparts to such articles a smoothness and regularity of surface which is a great factor in mechanical efficiency. Further, by removing the weaknesses inherent in a number of joins or splices, greater strength is secured from fewer layers of fabric; and the durability and efficiency of the belts, straps and like articles, are much increased by the consequent diminished possibility of opening, cracking and tearing. The reduction in the number of layers of fabric, and the elimination of seams and joins moreover, render the articles light in weight and extremely flexible. In any belt, strap or like article manufactured from a strip of fabric in which the warp is on the bias, tearing is practically impossible.

While the belts, straps and other like articles have been described as being manufactured of a composite rubber fabric, it is to be understood that other similar resilient materials might be used in place of rubber, such as rubber substitutes, and rubber compounds.

As many changes could be made in the construction above outlined, such as varying the number of plies of fabric, and varying the number of folds and methods of folding or rolling the fabric instead of folding it, within the scope of the claims, without departing from the spirit thereof, it is intended that all matters contained in the above specifications and accompanying drawings shall be interpreted as illustrating the principles and methods employed in my invention and not as limiting the scope of the claims to the methods and dimensions particularly set out.

I am aware that prior to my invention, endless belts, and like articles have been made of various fabrics impregnated with rubber and various other substances.

I therefore do not claim such an invention broadly, but what I do claim as my invention and desire to secure by Letters Patent is;

1. A seamless endless belt comprising a single strip of impregnated fabric wound longitudinally on itself a plurality of times, and having each side folded inwardly to overlap the other.

2. A seamless endless belt comprising a single strip of impregnated fabric three times the width of the belt, the said strip being wound longitudinally on itself, and having the sides folded inwardly to overlap each other.

3. The herein described method of manufacturing an endless belt of impregnated fabric, which comprises, first, forming a single strip of impregnated fabric of requisite length and width, then winding the fabric longitudinally upon itself a plurality of times, and then folding the edges inwardly to overlap each other.

4. A seamless endless belt comprising a single strip of impregnated fabric having overlapping diagonally cut ends and being wound longitudinally on itself a plurality of times, and having inwardly folded sides overlapping each other.

5. A seamless endless belt comprising a circular strip of impregnated fabric wound longitudinally on itself a plurality of times and having the sides folded inwardly at equal distance to overlap each other, the width of the inwardly folded portion being equal to the final width of the belt.

In witness whereof I have hereunto set my hand in the presence of two witnesses.

ARTHUR MARK HARDY.

Witnesses:
GERTRUDE CONWORTH,
HARRY N. BARRY.